United States Patent Office 3,210,133
Patented Oct. 5, 1965

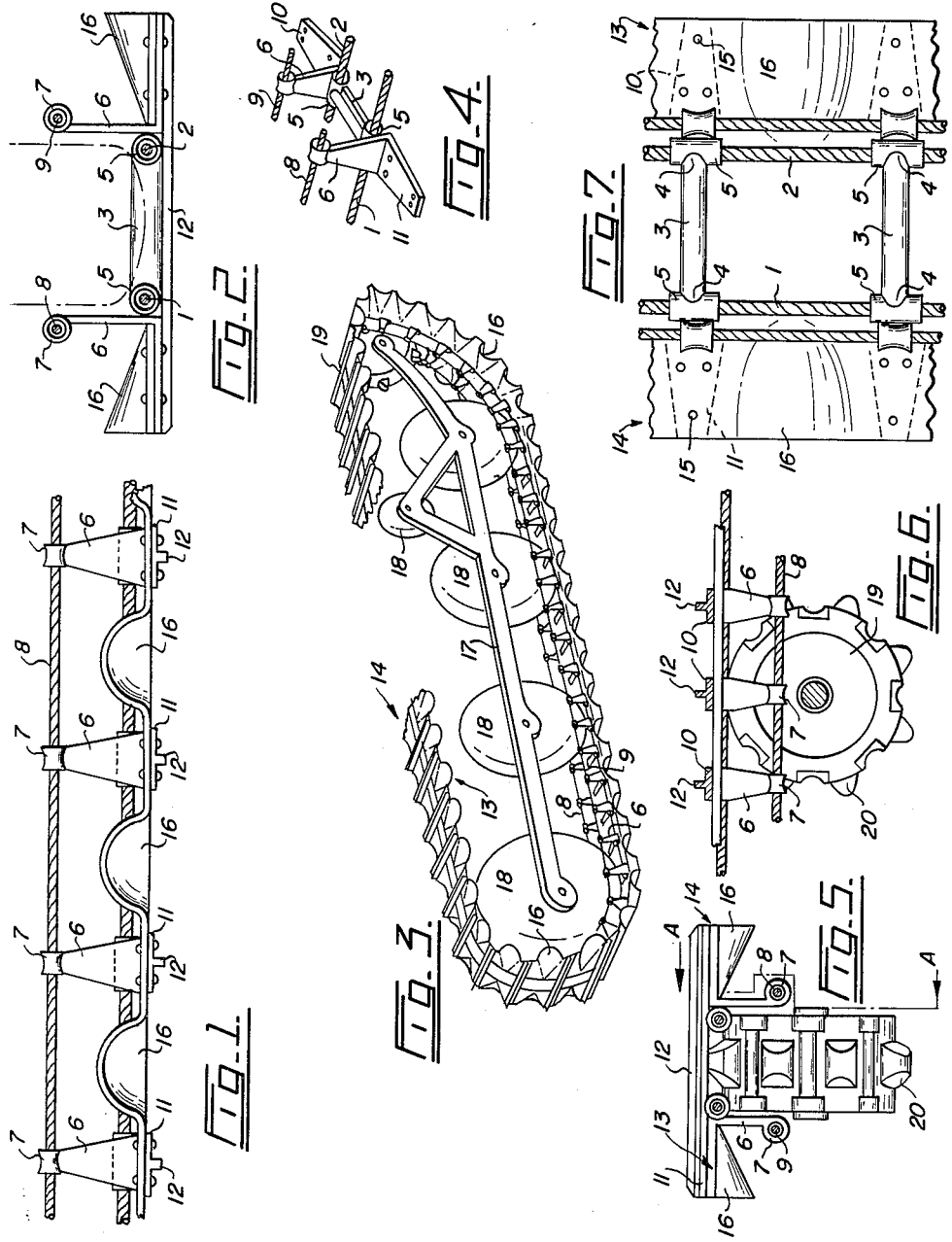

3,210,133
ENDLESS TRACK CONSTRUCTION
Gustaf William Swanson, 9559 103 Ave.,
Edmonton, Alberta, Canada
Filed May 8, 1963, Ser. No. 278,968
2 Claims. (Cl. 305—35)

This invention relates to an improved endless track for use particularly with vehicles intended to travel over snow or like terrain.

Numerous types of track vehicles have been developed for use over snow or other soft terrain and, generally, such track vehicles utilize a form of flexible track with cross slats or bars on the track that serve to grip the surface over which the vehicle is to travel.

The major difficulty with endless tracks of this type is that if the track is left sufficiently flexible to provide adequate gripping action, it is difficult to prevent the track from jumping the drive wheels.

Further, conventional tracks as used in vehicles for travelling over snow and like terrain usually have some form of articulated track framework and the multiplicity of joints and connections in such framework lead to a complex track mechanism that is difficult and costly to maintain in satisfactory operation and repair.

It is the principal object of the present invention to provide an improved endless track mechanism using pre-stressed cables instead of articulated links and so that the track will have sufficient flexibility to conform to uneven terrain.

An additional object is to provide an endless track mechanism wherein the drive cables are prestressed by stretching the cables under tension close to their maximum strength and at the same time passing the cables over a sheave which will tighten the lay of the cable and so that the cable will remain at its stretched length when the tension is removed the cables are installed twisted in opposite directions to counter-act any tendency for the track to twist while mounted on a vehicle.

An additional object is to provide an endless track incorporating prestressed and twisted guard cables to reduce the possibility of the track jumping its drive mechanism.

A still further object is to provide an endless track utilizing flexible strips for the traction portion of the track and with the strips formed into a series of cup-shaped depressions designed to increase and enhance the gripping action of the track.

In drawings illustrating a preferred embodiment:

FIG. 1 is a broken away side elevation showing a portion of a track constructed in accordance with my invention.

FIG. 2 is an end view of my track partly in section.

FIG. 3 is a projected view showing a track constructed in accordance with my invention and mounted on a set of driving and carrying wheels.

FIG. 4 is a broken away projected view showing the construction of the guard supports and track support extensions.

FIG. 5 is a sectional end view showing a portion of my track together with a driving wheel.

FIG. 6 is a side elevation taken substantially along the line A—A of FIG. 5.

FIG. 7 is a top plan view illustrating a section of my track with the track material.

With reference now to the drawings, the main drive cables 1 and 2 are held in spaced parallel relationship by the plurality of cross-members 3 secured at their ends 4 to ferrules 5 which are crimped on the cables 1 and 2. It will of course be understood that the ferrules 5 could be welded or otherwise secured to the cables and, if desired, the cross-members 3 could be secured to the cables by other means than the ferrules shown.

It should be noted that the cross-members 3 are spaced equally along the cables 1 and 2 and that the cross-members 3 provide links to receive the teeth of a drive wheel as will be described later in the specification. A pair of guard cables supports 6—6 are secured to the ferrules 5—5 at the opposite ends of the cross-members 3 and the guard cables supports 6 extend up from the ferrules 5 in parallel relationship. At their upper ends the guard cables supports are provided with sleeves 7 which are of sufficient diameter to receive the guard cables 8 and 9 and permit the guard cables to slide loosely in the sleeves 7 during operation of the track.

Track support extensions 10 and 11 also are connected at the opposite ends of the cross-members 3 to project in opposite directions away from the cables 1 and 2 and at right angles to the guard supports 6. Reference to FIG. 4 in the drawings will illustrate the construction comprising one of the cross-members 3, the ferrules 5—5 at the ends of the cross-member and the guard supports 6 as well as the track support extensions 10 and 11 secured at the ferrules 5 and projecting from the ferrules as described.

The track support extensions 10 and 11 are further linked together by the spine 12 which extends beneath the support extensions 10 and 11 and the cross-member 3 as best seen in FIG. 2 in the drawings.

The actual track in this construction comprises the strips indicated generally at 13 and 14 in the drawings. These strips would be constructed preferably from a suitable resilient material of suitable strength and are secured by rivets 15 or like means to the track support extensions. Between the track support extensions 10 on one side and 11 on the opposite side of the track, the strips are raised or distended to form the cup-like portions 16. These cup-like portions will act in somewhat the same manner as a web to cup over rocks, snow humps or lumps during operation of the device and thereby obtain maximum drive for the device.

In operation, the track would be formed and the ends would be connected together to provide an endless track as seen in FIG. 3 in the drawings. The track would be fitted over a framework 17 mounting idling wheels 18 and a drive sprocket 19 and the framework then would be adjusted to tighten the track securely on the wheels. The idling wheels 18 would operate between the guard cables 8 and 9 and would rotate on the cross-members 3 while the guide sprocket 19 has teeth 20 which would engage between the cross-members 3. With this construction, it will be obvious that, when power is applied to the drive sprocket 19 this would drive the endless track. During operation, the track formed with the prestressed drive cables 1 and 2 and prestressed guard cables 8 and 9 will not stretch during operation and if adjusted initially to the correct degree of tension on the framework 17 and idling wheels 18 will operate smoothly under action of the drive sprocket 19. At the same time, the guard cables 8 and 9 serve to prevent misalignment of the track or any danger of the track running off the idling wheels 18.

Drive cables 1 and 2 secured to the ends of cross-members 3 will provide a drive cable that has sufficient flexibility to pass over the small drive sprocket 19 without danger of undue stress to the track during its operation over the drive sprocket. At the same time, the guard cables 8 and 9 will operate loosely within the sleeves 7 at the upper ends of the guide supports 6 so that the track may be flexed at the drive cables 1 and 2 and the guard cables 8 and 9 will in no way interfere with the flexing operation.

What I claim as my invention is:

1. In an endless track construction, a pair of pre-stressed drive cables, a plurality of spaced cross members having ferrules at each end, such ferrules being crimped on the drive cables so that the cross members will extend between the cables and maintain the cables in spaced apart parallel relationship, a plurality of guard cable supports each secured at one end to one of the ferrules to extend up from the cables in substantially parallel relationship, sleeves at the opposite ends of the guard cable supports and a pair of pre-stressed guard cables connected slidably in the sleeves to inter-link the supports and to lie in spaced parallel relationship, a plurality of track support extensions each secured at one end of the ferrules to extend in laterally opposite directions away from the cables and flexible track material loosely disposed between and secured to the extensions on opposite sides of the cables.

2. The track as claimed in claim 1 wherein the drive and guard cables are twisted in opposite directions to counteract twisting action of the track.

References Cited by the Examiner
UNITED STATES PATENTS

| | | | |
|---|---|---|---|
| 2,179,587 | 11/39 | Deardorff | 305—40 X |
| 2,376,802 | 5/45 | Morse | 305—56 X |
| 2,733,965 | 2/56 | Gladden | 305—40 |
| 3,019,061 | 1/62 | Schomers | 305—56 X |

ARTHUR L. LA POINT, *Primary Examiner.*